(12) United States Patent
McClure

(10) Patent No.: US 11,231,057 B2
(45) Date of Patent: Jan. 25, 2022

(54) HOLE ALIGNMENT TOOL WITH COMPLIANCE ZONE FEATURE

(71) Applicant: Centrix Inc., Kent, WA (US)

(72) Inventor: Travis D. McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 571 days.

(21) Appl. No.: 15/783,860

(22) Filed: Oct. 13, 2017

(65) Prior Publication Data
US 2018/0051729 A1  Feb. 22, 2018

Related U.S. Application Data

(63) Continuation-in-part of application No. PCT/US2016/026973, filed on Apr. 11, 2016.
(Continued)

(51) Int. Cl.
*F16B 5/02* (2006.01)
*B25B 31/00* (2006.01)
(Continued)

(52) U.S. Cl.
CPC .............. *F16B 5/025* (2013.01); *B25B 27/00* (2013.01); *B25B 31/005* (2013.01); *F16B 19/02* (2013.01)

(58) Field of Classification Search
CPC ...... F16B 5/025; F16B 5/0258; F16B 5/0275; F16B 19/02; F16B 13/001; B25B 27/00; B25B 31/005; B25B 27/062; B25B 27/02; B25B 27/023; Y10T 29/53848; Y10T 29/53883; Y10T 29/53887
(Continued)

(56) References Cited

U.S. PATENT DOCUMENTS

| 1,978,935 A | 10/1934 | Douglas |
| 2,370,336 A | 2/1945 | Wallace |

(Continued)

FOREIGN PATENT DOCUMENTS

| GB | 413403 A | * 7/1934 | ........... B25B 31/005 |
| GB | 413403 A | 7/1934 | |

(Continued)

OTHER PUBLICATIONS

GB 413403A Translation (Year: 1934).*
(Continued)

*Primary Examiner* — Tyrone V Hall, Jr.
*Assistant Examiner* — Abbie E Quann
(74) *Attorney, Agent, or Firm* — McCoy Russell LLP

(57) ABSTRACT

Hole alignment tools, methods of making such tools, and methods for aligning holes in a plurality of work pieces are disclosed. The hole alignment tools may exert, when fully engaged with similarly sized, stacked holes, a substantially uniform force against the work piece surfaces that define the holes. The hole alignment tool includes a doweling body having a plurality of radially expandable legs, a housing, and a spreader element. The doweling body legs include a decreasing sectional thickness extending from the distal ends thereof towards the proximal end of the doweling body. Depending upon its state, the radial profile of a doweling body's legs may be converging or parallel for tool insertion and removal, or diverging for alignment purposes.

17 Claims, 11 Drawing Sheets

Related U.S. Application Data

(60) Provisional application No. 62/116,217, filed on Feb. 13, 2015.

(51) Int. Cl.
  *B25B 27/00* (2006.01)
  *F16B 19/02* (2006.01)

(58) Field of Classification Search
  USPC .......................................................... 29/271
  See application file for complete search history.

(56) References Cited

U.S. PATENT DOCUMENTS

| | | | |
|---|---|---|---|
| 2,379,786 A | 7/1945 | Bugg et al. | |
| 2,649,884 A | 8/1953 | Westover | |
| 2,775,155 A | 12/1956 | Tompkins et al. | |
| 2,936,015 A | 5/1960 | Rapata | |
| 2,994,242 A | 8/1961 | Buff et al. | |
| 3,469,493 A | 9/1969 | Fisher | |
| 5,065,490 A | 11/1991 | Wivagg et al. | |
| 5,704,752 A | 1/1998 | Logerot | |
| 5,799,408 A | 9/1998 | Sprayberry | |
| 6,056,283 A * | 5/2000 | Gage | B25B 31/005 269/48.4 |
| 6,287,044 B1 | 9/2001 | Huber | |
| 6,755,407 B1 | 6/2004 | Olson et al. | |
| 7,219,581 B2 | 5/2007 | Tulloch et al. | |
| 7,300,042 B2 * | 11/2007 | McClure | B25B 31/005 269/309 |
| 2003/0150304 A1 * | 8/2003 | Morgan | B23B 31/06 82/155 |
| 2007/0220731 A1 | 9/2007 | Soroka et al. | |
| 2013/0039716 A1 * | 2/2013 | McClure | F16B 13/0833 411/80.1 |
| 2013/0081257 A1 | 4/2013 | McClure | |
| 2014/0084610 A1 * | 3/2014 | Nguyen | B25B 27/00 294/19.3 |

FOREIGN PATENT DOCUMENTS

| | | |
|---|---|---|
| GB | 1548964 A | 7/1979 |
| JP | H1151018 A | 2/1999 |

OTHER PUBLICATIONS

See attached foreign translation. (Year: 1934).*
ISA United States Patent and Trademark Office, International Search Report Issued in Application No. PCT/US2016/026973, dated Jul. 15, 2016, WIPO, 3 pages.
ISA United States Patent and Trademark Office, Written Opinion Issued in Application No. PCT/US2016/026973, dated Jul. 15, 2016, WIPO, 9 pages.

* cited by examiner

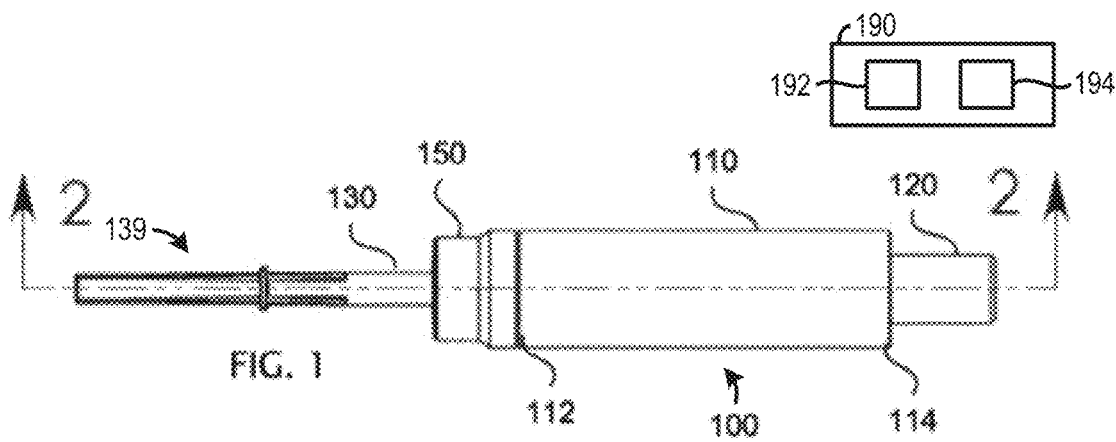
FIG. 1
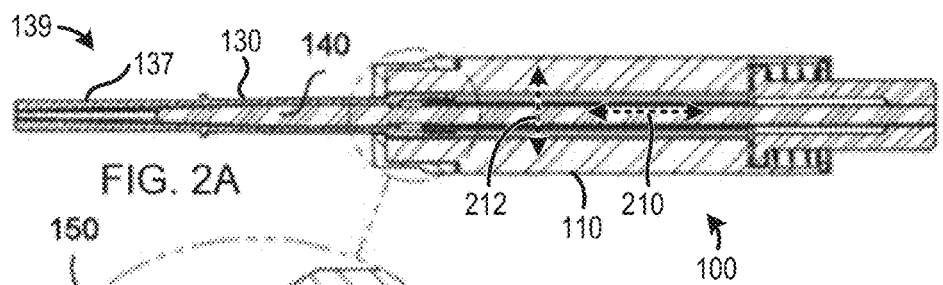
FIG. 2A
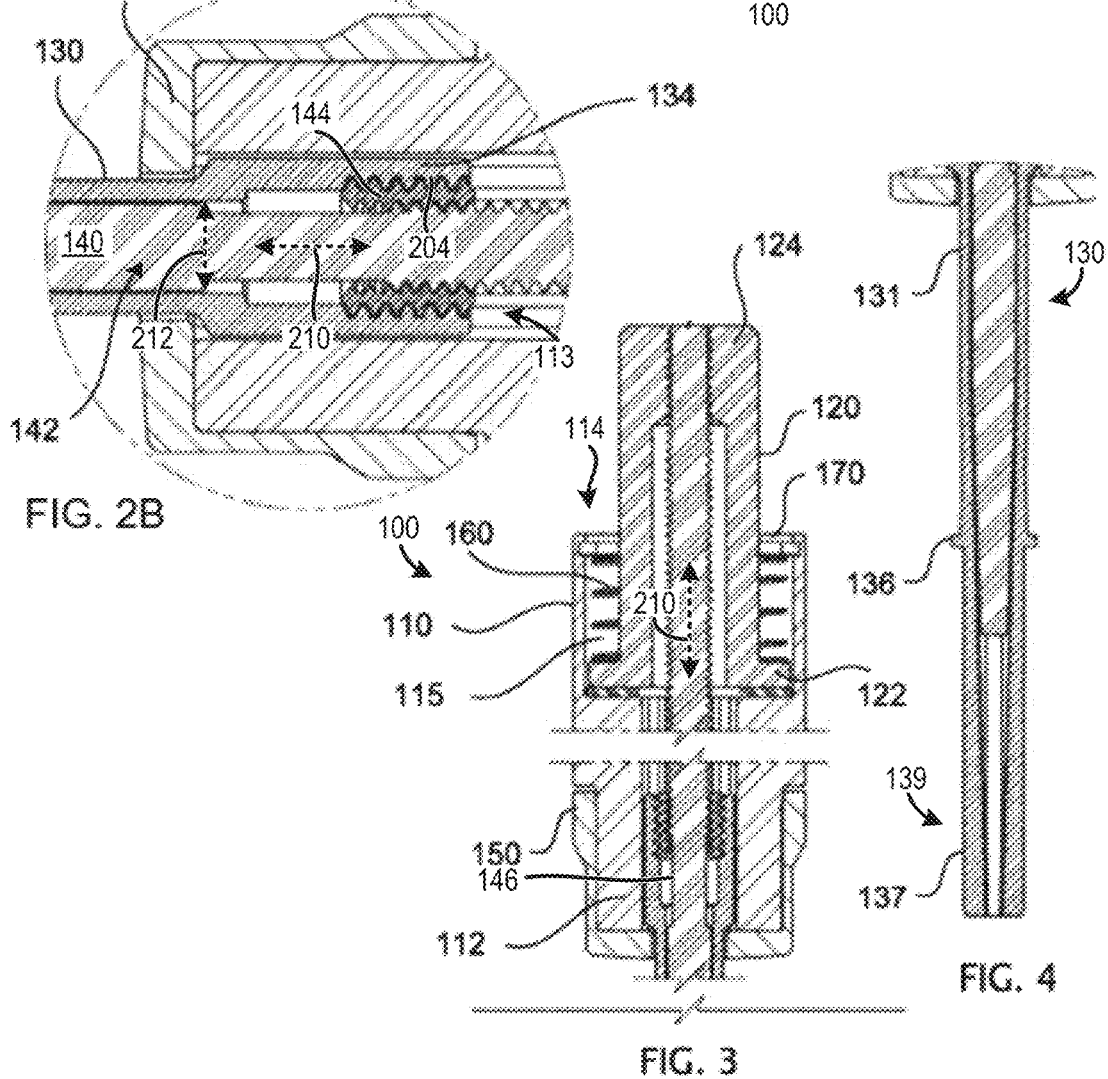
FIG. 2B
FIG. 3
FIG. 4

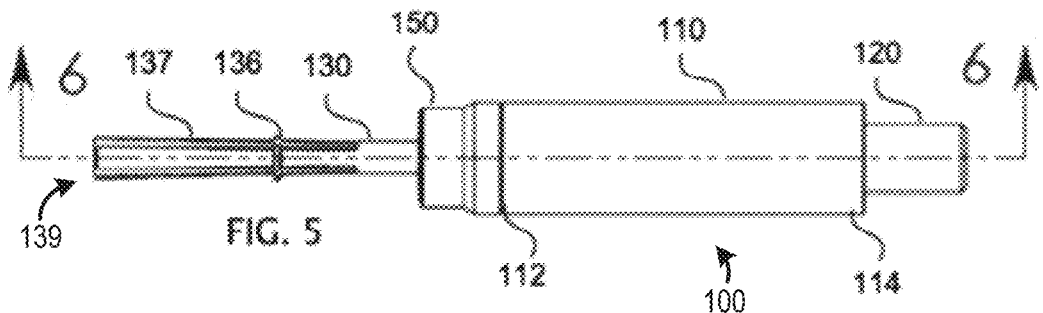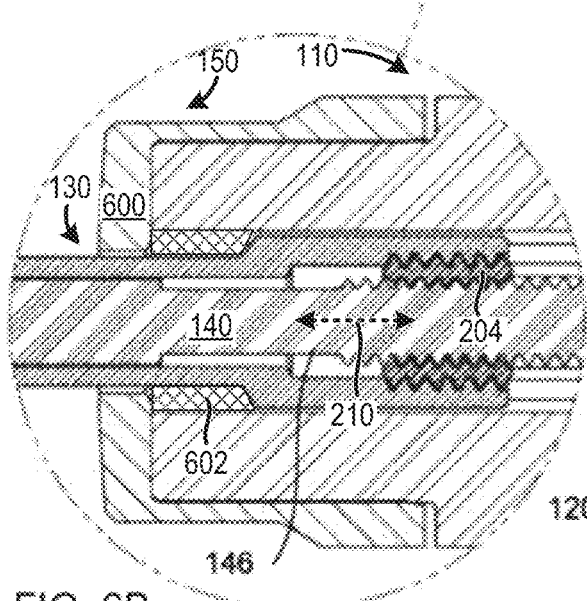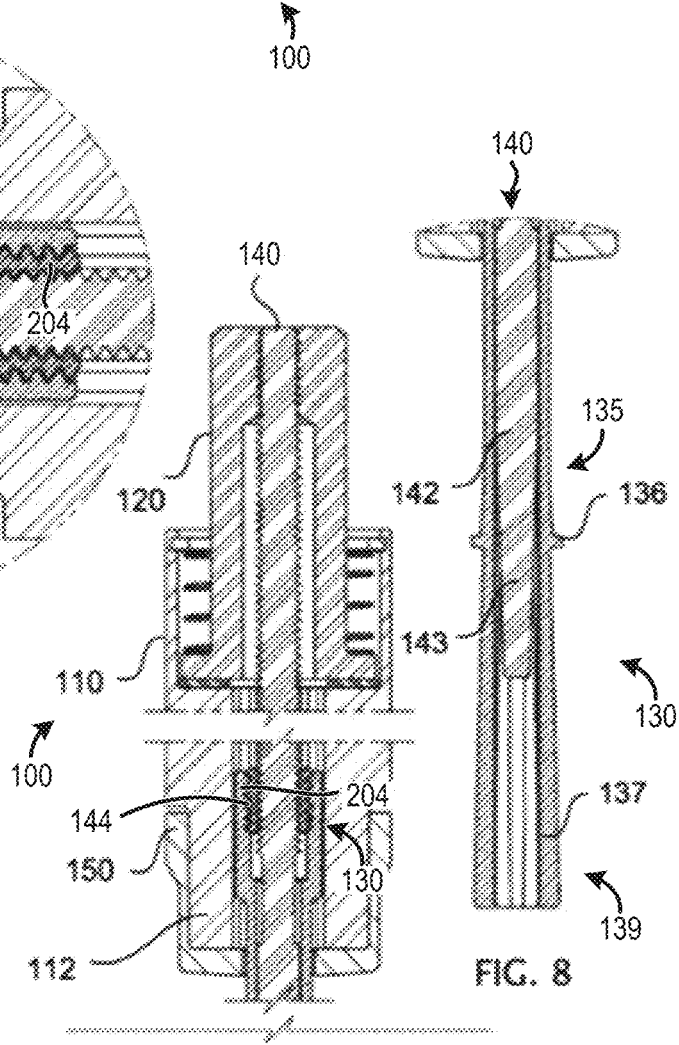

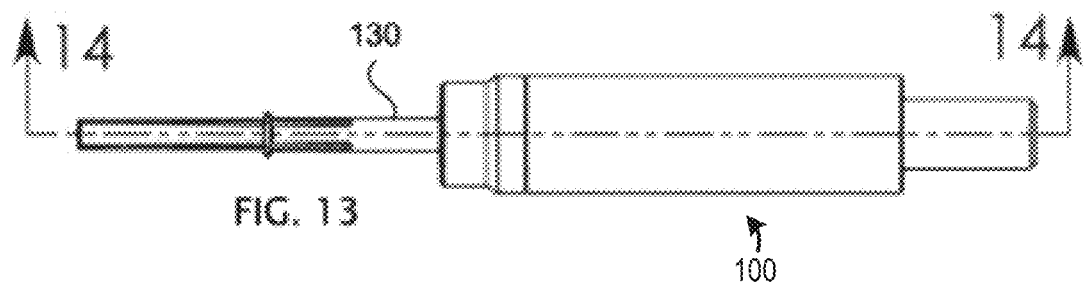
FIG. 13
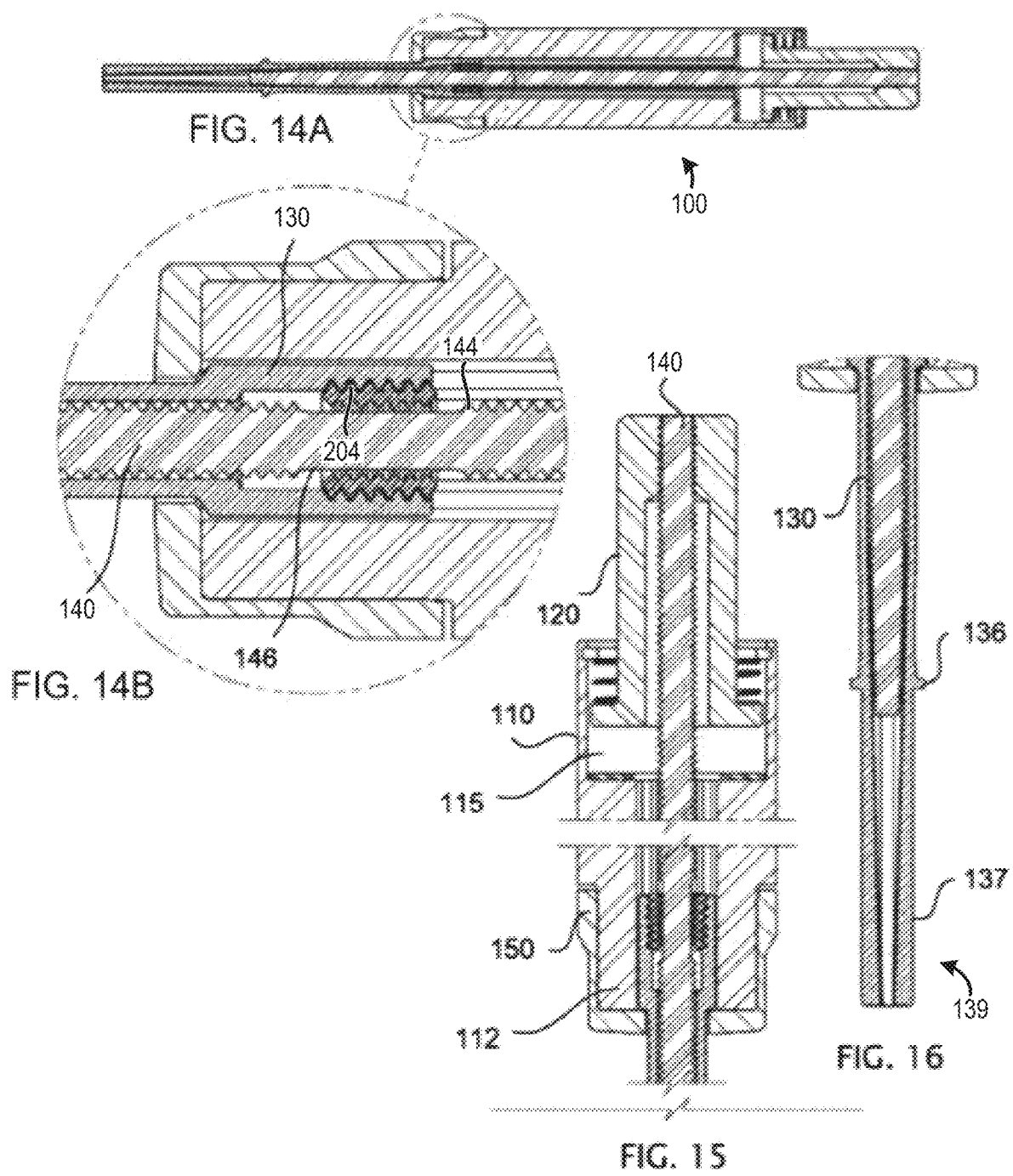
FIG. 14A
FIG. 14B
FIG. 15
FIG. 16

SECTION 31-31

SECTION 32-32

SECTION 33-33

SECTION 34-34

SECTION 35-35

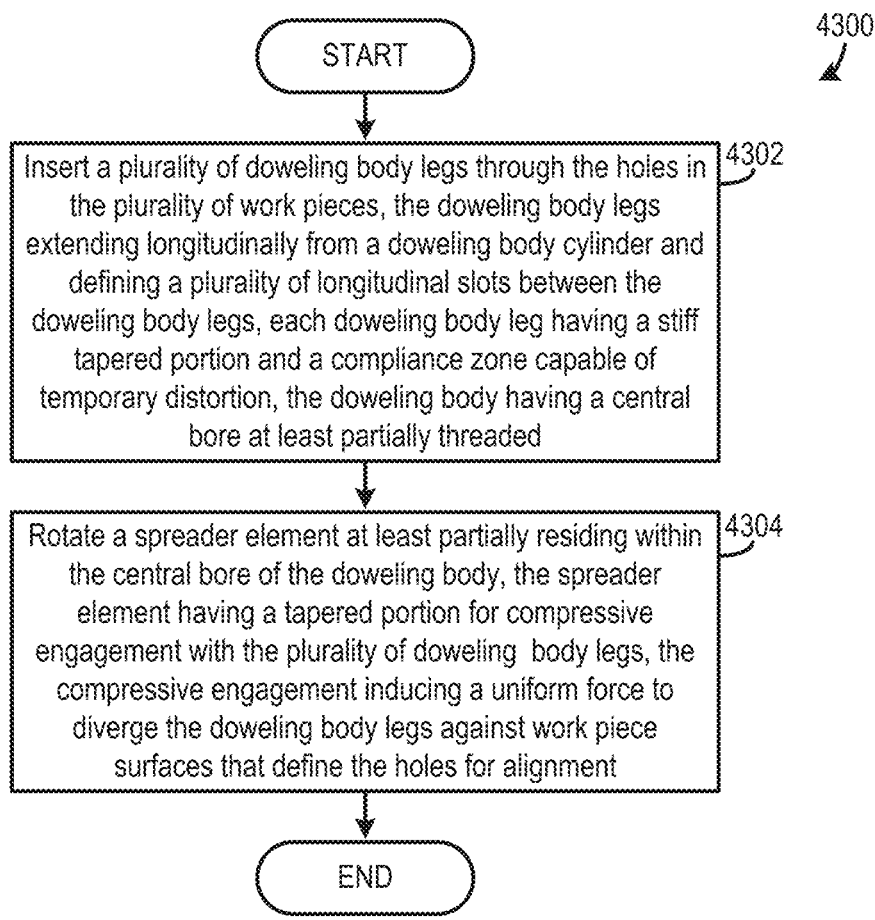

HOLE ALIGNMENT TOOL WITH COMPLIANCE ZONE FEATURE

CROSS REFERENCE TO RELATED APPLICATION

The present application is a continuation-in-part of International Patent Application Serial No. PCT/US2016/026973 entitled "A HOLE ALIGNMENT TOOL WITH COMPLIANCE ZONE FEATURE", and filed on Apr. 11, 2016. International Patent Application Serial No. PCT/US2016/026973 claims priority to U.S. Provisional Application No. 62/116,217 entitled "ALIGNMENT TOOL", and filed on Feb. 13, 2015. The entire contents of the above-referenced applications are hereby incorporated by reference in their entirety for all purposes.

TECHNICAL FIELD

This description relates generally to hole alignment tools and more specifically to hole alignment tools capable of maintaining substantially uniform diametrical conformance with work piece surfaces that define the holes.

BACKGROUND

Many hole alignment tools are not typically fully doweling, i.e., where there is uniform radial expansion against the surfaces defining the holes to be aligned (or there is generally uniform radial force against the work pieces defining the holes). In other words, previous alignment tools do not have full, uniform contact with the work pieces, e.g., they function as wedges. This limitation of the prior art is most noticeable when the stack height of multiple work pieces is greater than the diameter of the holes that are to be aligned.

Solutions to this limitation have included hole aligning tools that have floating expansion elements that permit true radial displacement of the tool's expansion elements over their working length, and defined taper tools wherein the expansion elements having an internal surface taper matching that of a central displacing member. However, in the first instance, a complicated supporting structure is needed to retain yet allow movement of the expansion elements while in the second instance there is but a single "sweet spot" wherein the two tapers match to yield a fully constant radial displacement of the expansion elements. In the latter instance, even where flexural characteristics of the expansion elements increase the range of the "sweet spot", manufacturing constraints concerning the extent of the axial run of expansion elements inner surface taper limit the effective axial range of radial expansion. Furthermore, in certain alignment tools with expansion elements a bushing may be inadvertently wedged between two work piece plates. In other alignment tools with expansion elements a pin may be longer than the work piece stack or the pin may not be fully inserted into the stack. Consequently, the segments of the hole alignment tool that are outside of the stack continue to expand even though the segments of the pin in the hole have been expanded to contact the sides of the hole. Such overexpansion of the pin can cause damage to the pin. Furthermore, in alignment tools with a pin that extends beyond the work piece hole the portion of the pin outside the hole may expand and thus cannot be pulled back through the hole. Consequently, the pin will be stuck in the stack.

SUMMARY

The following presents a simplified summary of the disclosure in order to provide a basic understanding to the reader. This summary is not an extensive overview of the disclosure and it does not identify key or critical elements of the present disclosure or delineate the scope of the present disclosure. Its sole purpose is to present some concepts disclosed herein in a simplified form as a prelude to the more detailed description that is presented later.

To address at least some of the problems presented by the prior art, a doweling body for use in an alignment tool is provided. The doweling body includes a doweling body cylinder defining a doweling body central bore with a longitudinal axis, and including a proximal end, a distal end, and a body portion positioned axially between the proximal end and the distal end, a first part of the two part anti-rotation component disposed at the proximal end, the first part of the two part anti-rotation component mating with the second part of the two part anti-rotation component included in a housing to inhibit rotation of the doweling body and the housing and allow axial translation of the doweling body with regard to the housing, and a plurality of doweling body legs extending longitudinally from the distal end of the doweling body cylinder and defining a plurality of longitudinal slots between the doweling body legs, each doweling body leg having a transition portion and a compliance zone capable of temporary distortion to allow the doweling body legs to shift outwardly away from a central axis. In this way, the doweling body can be used to create substantially uniform radial expansions against holes in a work piece. Consequently, the alignment tool may be easily inserted into work piece holes without work piece deformation to facilitate quick and efficient tooling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Many of the attendant features will be more readily appreciated as the same becomes better understood by reference to the following detailed description considered in connection with the accompanying drawings.

BRIEF DESCRIPTION OF DRAWINGS

The present description will be better understood from the following detailed description read in light of the accompanying drawings, wherein:

FIG. 1 is a side elevation view of a hole alignment tool according to the present disclosure wherein the tool is shown in an insertion state, i.e., a nominal state.

FIG. 2A is a side elevation view in section taken substantially along the line 2-2 in FIG. 1, wherein the location of the spreader element in the doweling body and the generally non-divergent doweling body legs are particularly shown.

FIG. 2B is a detailed view of the initial threaded engagement and relative positions between the doweling body and the spreader element, as shown in FIG. 2A.

FIG. 3 is a detailed view of a drive element position relative to the housing and the threaded engagement between the doweling body and spreader element, as shown in FIG. 2A.

FIG. 4 is a detailed view of the non-compressive engagement between the tapered portion of the spreader element and the doweling body, and relative positions there between, as shown in FIG. 2A.

FIG. 5 is a side elevation view of the alignment tool of FIG. 1 wherein the tool is shown in a first or initial doweling state, i.e., initial radial displacement of the doweling body legs due to retraction of the doweling body into the housing.

FIG. 6A is a side elevation view in section taken substantially along the line 6-6 in FIG. 5, wherein the location of the spreader element with respect to the doweling body is particularly shown.

FIG. 6B is a detailed view of the continued threaded engagement and relative positions between the doweling body and the spreader element, as shown in FIG. 6A.

FIG. 7 is a detailed view of the drive element position relative to the housing and the threaded engagement between the doweling body and spreader element as shown in FIG. 6A.

FIG. 8 is a detailed view of the initial compressive engagement between the tapered portion of the spreader element and the doweling body, and relative positions there between, as shown in FIG. 6A.

FIG. 13 is a side elevation view of the alignment tool of FIG. 1 wherein the tool is shown in a retraction state, i.e., doweling body threads are decoupled from spreader element threads.

FIG. 14A is a side elevation view in section taken substantially along the line 14-14 in FIG. 13, wherein the location of the spreader element with respect to the doweling body is particularly shown.

FIG. 14B is a detailed view of the threaded disengagement and relative positions between the doweling body and the spreader element, as shown in FIG. 14A.

FIG. 15 is a detailed view of the drive element position relative to the housing (note distal extension of drive element and compression of biasing spring) and the threaded disengagement between the doweling body and spreader element, as shown in FIG. 14A.

FIG. 16 is a detailed view of the non-compressive engagement between the tapered portion of the spreader element and the doweling body, and relative positions there between, as shown in FIG. 14A.

FIG. 21 is a cross section elevation view taken substantially along the line 21-21 in FIG. 17, particularly showing the concentric relationships between the spreader element, the doweling body the housing bore, and the housing cap, which includes a second form of the second part of the two part anti-rotation component, as well as the interactions there between.

FIG. 43 shows a method for aligning holes in a plurality of work pieces.

Like reference numerals are used to designate like parts in the accompanying drawings.

FIGS. 1-42 have been drawn to scale. However other relative dimensions may be used, in other embodiments.

DETAILED DESCRIPTION

Figure 9:
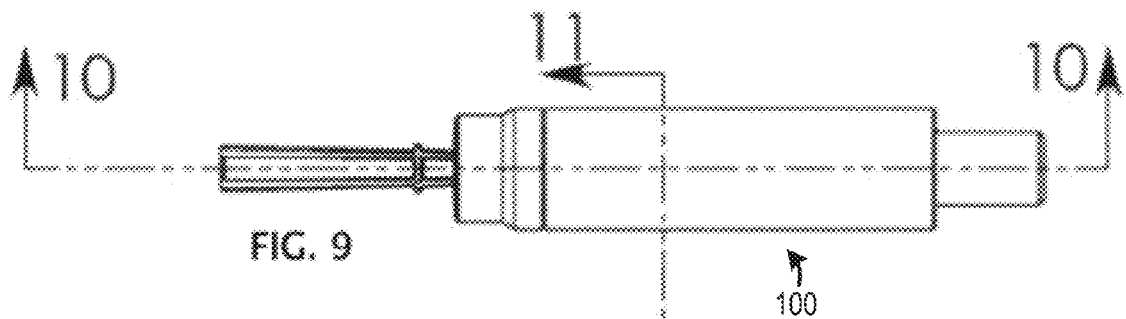
FIG. 9 is a side elevation view of the alignment tool of FIG. 1 wherein the tool is shown in a second or final doweling state, i.e., maximal radial displacement of the doweling body legs due to maximal retraction of the doweling body into the housing.
Figure 10A:
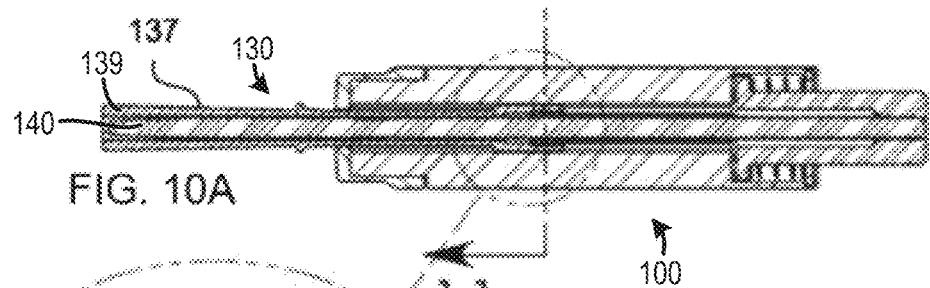
FIG. 10A is a side elevation view in section taken substantially along the line 10-10 in FIG. 9, wherein the location of the spreader element with respect to the doweling body is particularly shown.
Figure 10B:
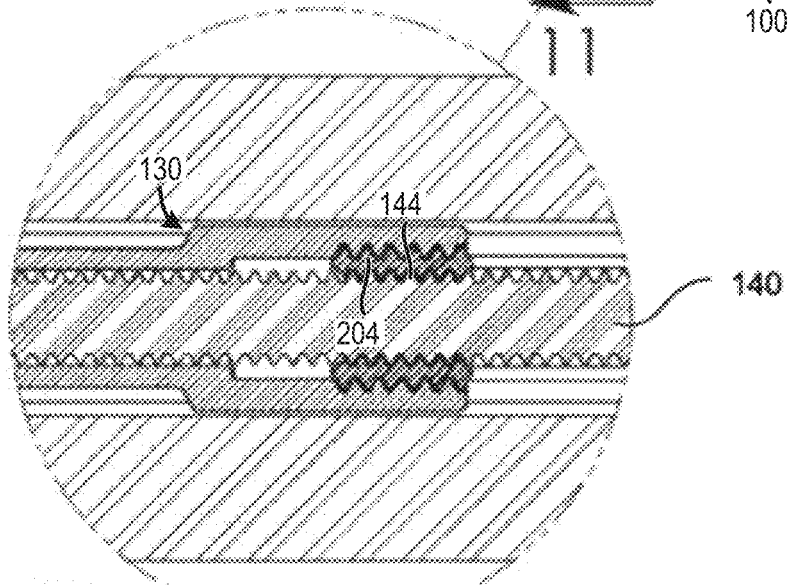
FIG. 10B is a detailed view of a maximum amount of threaded engagement and relative positions between the doweling body and the spreader element, as shown in FIG. 10A.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. The examples below describe hole alignment tools, methods of making such tools, and methods for aligning holes in a plurality of work pieces. The hole alignment tools exert, when fully engaged with similarly sized, stacked holes, a substantially uniform diametrical conformance with the work piece surfaces that define the holes. The substantial uniformity ensures reduced (e.g., minimal) or no work piece deformation, in some cases, as well as full doweling. For instance, the alignment tools described herein may create alignment in work piece plates that are misaligned. Thus, in one alignment tool embodiment shear forces are exerted by the tool on a work piece. The aligning feature of the tool may create a cylinder shape in the legs during use in a work piece hole. The cylindrical shape may be more or less constant through the stack of plates being aligned, in some examples. Thus, the plates may provide reactions that facilitate the creation of the cylinder. The advantage of this configuration is that the tool can create cylindrical alignment through a robust range of hole diameters. Further in one example, legs in the alignment tool may be initially positioned in a tapered shape (e.g., conical shape) for easy work piece installation. Subsequently to use in a work piece the legs may return to the tapered shape for easy removal.

Although the present examples are described and illustrated herein as being implemented in various embodiments, the description is provided as an example and not a limitation. As those skilled in the art will appreciate, the present examples are suitable for application in a variety of different types.

According to the present disclosure, the hole alignment tools may include a doweling body having a plurality of radially expandable legs, a housing, and a spreader element. Unless otherwise indicated, these components may be constructed from a hard yet resilient material.

In some embodiments, doweling bodies may be generally characterized as a cylinder defining a centrally disposed bore, and which includes a proximal end, a distal end, and a body portion separating the two ends wherein the body portion has a proximal zone extending from a central zone to the proximal end, and a distal zone extending from the central zone to the distal end. Each doweling body includes a longitudinal axis, an outer surface, and an inner surface that defines the central bore. In various present disclosure embodiments, the central bore is characterized as having a generally constant diameter in at least the distal zone of the doweling body when the same is in a non-nominal or alignment state. However, when in an insertion or removal state, the central bore has a converging or conical geometry where the bore diameter progressively decreases towards the distal end.

In some embodiments, at or about the proximal end (or the proximal end of the proximal zone), the doweling body may include a first part of a two part anti-rotation component operatively mating with a second part of the two part anti-rotation component found in the housing. This first part of the two part anti-rotation component is often characterized as having a non-circular outer surface (when viewed in cross section) and/or a longitudinal land or groove, and, depending upon the constitution of the second part, may extend substantially along the doweling body in the longitudinal direction. Moreover, the inner surface of the doweling body at the proximal end and/or the proximal end of the proximal zone, or the outer surface of the doweling body at the proximal end, is threaded to operatively mate with threads formed on the outer surface in the first instance of the spreader element, or an inner surface of the spreader element in the second instance, respectively.

In some embodiments, at least the body portion of the doweling body may include the first part of the two part anti-rotation component, and operatively mates with a second part of the two part anti-rotation component, which may be found at a distal end of the housing, as will be described in more detail below. However, the second part of the two part anti-rotation component may be positioned in other suitable locations, in other embodiments.

In some embodiments, extending axially from the body portion of the doweling body to the distal end thereof may be a plurality of slots, which are defined by a plurality of doweling body legs (i.e., each leg is bounded by a pair of adjacent slots, each of which extends from the outer surface to the inner surface of the doweling body). Each leg may be flexible in a generally radial direction, with greatest axial deflection potential occurring at a distal end thereof and with the least deflection potential occurring at a proximal or root end thereof when the tool is in a nominal state. In many embodiments, there is an annular stop member between the leg roots and distal ends that functions to prevent over-insertion of the distal end of the doweling body into the work piece holes, i.e., a translation arresting means.

In some embodiments, the housing of the alignment tool may include a cylinder defining a longitudinal axis between distal and proximal ends, an outer surface, and an inner surface that defines a central bore. The central bore is sized to accept at least the proximal end and proximal zone of the doweling body, and is characterized in a first series of embodiments as having the second part of the two part anti-rotation component, preferably substantially throughout its axial length when the doweling body has a proximally located first part anti-rotation component, or, in a second series of embodiments, at the distal end thereof when the doweling body has the first part of the two part anti-rotation component located at least along its body portion.

In some embodiments, the central bore at the proximal end of the housing may meet an enlarged recess having a diameter substantially greater than the bore diameter. This recess accepts a biasing member, which is often a spring, and part of a drive element.

In addition to the foregoing elements, hole alignment tools according to the present disclosure may further include the previously referenced translatable spreader element, which includes a proximal portion characterized as a shank having an externally threaded portion extending distally towards a central portion in many embodiments, and which includes a distal portion, characterized as a converging taper towards a distal end thereof. The distal portion is at least partially disposed in the central bore of the doweling body when the components thereof are assembled. Both a portion the doweling body (generally at least the proximal end thereof) and a proximal end of the spreader element are mechanically linked to the housing body when such a tool is in use.

Certain present disclosure embodiments may include a reduced diameter portion for externally threaded spreader elements that threadably decouples the doweling body from the spreader element. This portion, which is preferably also unthreaded, provides an alternative means for arresting over-rotation of the spreader element that might otherwise cause thread binding and tool breakage if a hard stop feature were used. To facilitate re-engagement between the spreader element and the doweling body, a bias means is used to urge the spreader element distally. A compression spring may be disposed between the housing and a drive element having a lip for receiving one end of the bias means where the drive element is fixedly attached to the spreader element (the other end of the bias means being received by a portion of the housing).

In some embodiments, a feature of doweling bodies may concern the sectional profile of each leg. Each leg includes a transition portion adjacent the leg distal end (and therefore part of the distal zone) that is characterized as an area of non-uniform radial sectional or wall thickness (also referred to as a flare), and/or non-uniform arc length. A change in radial sectional thickness and/or arc length of a leg portion intentionally affects flexure characteristics of the legs in very specific and intentional ways.

Doweling body legs according to the present disclosure include a decreasing sectional thickness or negative taper extending from the distal ends thereof towards the proximal end of the doweling body. The translation arresting means, if present, may be located at or proximate to the termination of the flare presenting to the proximal end of the doweling body, both of which are preferably proximal to the leg roots.

As used herein, the term "taper" means a progressively changing material thickness in the radial direction (sectional thickness). With respect to doweling body legs, a progressing taper (positive or negative) is ascertained from inspection of the distance between the inner surface of a leg to the outer surface of the same leg, in the radial direction, and considered as a function of distance along the longitudinal axis of the doweling body. Taper should not be confused with the radial profile of the legs, which considers the mean axially progressing change in radial distance between the doweling body axis and the outer surface of the doweling body. The radial profile of a doweling body's legs may be converging, parallel, or diverging, depending upon its state. For instance, a converging or parallel radial profile is desirable for tool insertion and removal, while a diverging radial profile is desirable for alignment purposes.

In some embodiments, the doweling bodies may be characterized as having a constant central bore diameter when initially machined. Therefore, only a conventional drill or other constant diameter cutting tool is needed to form the bore or inner surface of the doweling body legs. This manufacturing expedient eliminates the requirement of using a boring bar or other bore enlarging tool otherwise necessary to create a positive taper extending from the distal end of the doweling body, which drastically reduces manufacturing time and production costs. Subsequent to initial machining, the legs are radially constricted such that the outer diameter of the doweling body at the legs is at least parallel, if not converging, and treated so that this profile becomes nominal (e.g., upon temporary radial displacement, the legs will have a restoration bias to the nominal state).

In addition to the modifying leg taper in the doweling bodies of the present disclosure to affect flexural characteristics of the legs, such characteristics can also be modified by varying the arc length of the legs, e.g., modifying the slot width. Thus, a leg section wherein increased flexion is desired can have both reduced sectional thickness as well as reduced arc length, when compared to adjacent leg sections.

Modification of leg flexural characteristics over the length of the legs allows doweling bodies according to the present disclosure to highly approximate full doweling alignment of holes without the complexity of prior art alignment efforts. In particular, when a doweling body according to the present disclosure is inserted into a plurality of holes defined by a work piece stack, and the distal portion of the legs are urged radially outwardly, such as by the relative introduction of a spreader element there at (relative introduction is independent of whether the spreader element moves towards the distal end of the doweling body or the doweling body moves towards the proximal end of the spreader element), the distal outer surfaces of the legs first meet resistance due to the negative taper present in the legs. As the radially outward displacement spreads further away from the distal end of the doweling body, a greater "induced" diametrical conformance is created proximally from the actual point of spreader element contact with each leg inner surface. This induced conformance mimics the compliance created by a cantilever if the legs were unconstrained by the doweling body at their roots.

Although the leg roots are mechanically linked to the doweling body, some level of elasticity (and therefore compliance with the induced displacement) can be achieved by intentionally localizing a zone of decreased leg stiffness beyond the work piece stack in the proximal direction and up to the leg root; this zone is referred to herein as a compliance zone. In such a manner, the induced radially outward displacement created inside the stack is able to create a temporary material distortion occurrence in the compliance zone whereby a portion thereof presented to the distal end of the doweling body is transitioned radially outwardly and a portion proximally transitioning radially inwardly. The resulting temporary deformation permits the leg to elastically conform to the proximally located wall(s) of the hole(s) in the stack. When the induced displacement is removed, the compliance zone returns to its nominal state.

For purposes of this description, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

Figure 40:
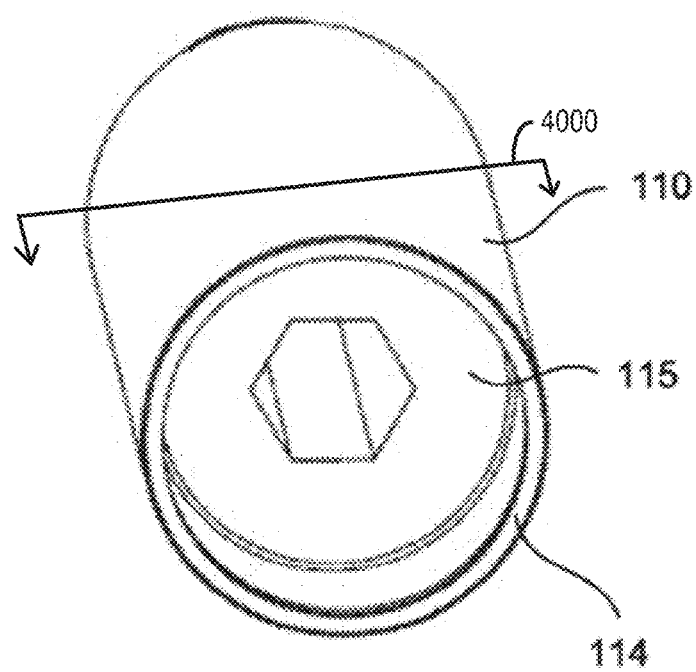
FIG. 40 is a perspective view of the proximal end of the housing according to a first embodiment of the present disclosure.
Figure 41:
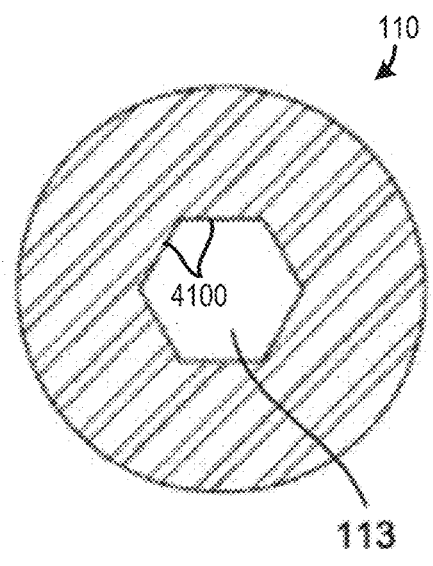
FIG. 41 is a cross section of the housing 110 of FIG. 40, particularly showing the geometry of the first form of the second part of the two part anti-rotation component.
Figure 42:
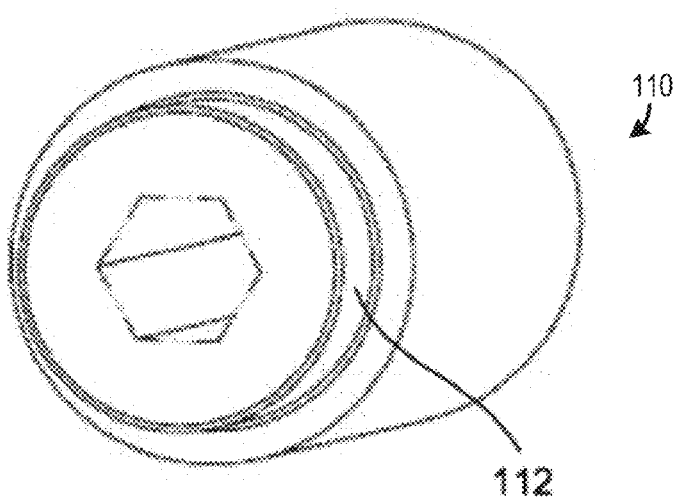
FIG. 42 is a perspective view of the distal end of the housing of FIG. 40.

FIGS. 1-4 illustrate various views of a hole alignment tool 100 in an insertion state, or a nominal state, according to the present disclosure. The alignment tool 100 includes a housing 110 and a doweling body 130 partially disposed within the housing 110 and a spreader element 140. In the insertion state, the spreader element 140 has an initial threaded engagement with the doweling body 130 and generates a small (e.g., minimal) or no radially outward displacement, in some instances, on a plurality of doweling body legs 139, which are in a converging radial profile. The spreader element 140 includes a threaded portion 144 designed to engage with a threaded section 204 of the doweling body 130. It will be appreciated that rotating (e.g., clockwise or counterclockwise) the spreader element 140 into the doweling body 130 moves the spreader element in axial directions with regard to the doweling body. The housing 110 defines a central housing bore 113 with longitudinal axis 210 (e.g., central axis) between a housing distal end 112 and a housing proximal end 114. A radial axis 212 is also provided in FIG. 2B, for reference. The central housing bore 113 is sized to accept at least a portion of the doweling body 130 and may act as a second part of a two part anti-rotation component. Exemplary enlarged illustrations of the housing 110 are shown in FIGS. 40-42. The central housing bore 113 has a hexagonal shape, in the illustrated example. However, other profiles of the central housing bore 113 have been contemplated, such a square profile, lobed profile, octagonal profile, etc.

Figure 29:
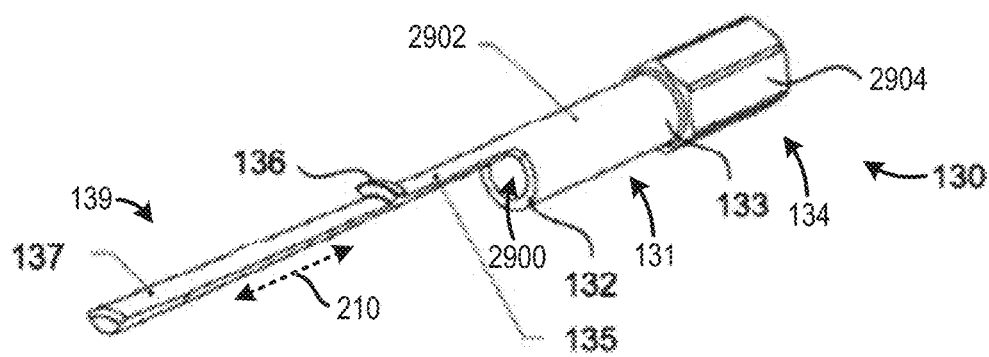
FIG. 29 is a perspective view of an illustrative doweling body having only a single leg for simplicity of illustrating the stiffness characteristics of the leg.

Referring to FIG. 29, showing a detailed view of the doweling body 130. Although FIG. 29 only shows one of the doweling body legs 139 it will be appreciated that the doweling body 130 may include a plurality of legs. The doweling body 130 has a doweling body cylinder 131 defining a central doweling body bore 2900 with a longitudinal axis 210, and includes a distal end 132, a proximal end 133, and a body portion 2902 separating the two ends. A first part 134 of the two part anti-rotation component may be disposed at the proximal end 133 of the doweling body cylinder 131. The first part 134 of the two part anti-rotation component includes sides 2904 that are contoured to mate with a second part of the two part anti-rotation component. Specifically, in the depicted examples, the sides 2904 form a male hexagonal shape.

As previously mentioned, the second part of the two part anti-rotation component may be the central housing bore 113 in the housing 110, shown in detail in FIG. 41. The central housing bore 113, in the illustrated example, includes sides 4100 that axially extend down the housing 110. Specifically, as shown in FIG. 41, the central housing bore 113 has a female hexagonal shape. Correspondingly, the first part 134 of the two part anti-rotation component in the doweling body 130, shown in FIG. 29, is contoured to mate with the central housing bore 113, shown in FIG. 41. Specifically, the first part 134 in the doweling body 130 has a male hexagonal shape, as previously mentioned. In this way, the two part anti-rotation component is configured to substantially inhibit rotation of the doweling body 130 and the housing 110 with regard to one another while allowing axial translation there between. Furthermore, other mating contours for the two part anti-rotation component have been contemplated such as square contours, lobed contours, octagonal contours, etc. As described herein a lobe is a structural feature with a curved surface (e.g., arced surface) that is non-planar.

Therefore, in some embodiments, the first part of the two part anti-rotation component is a polygon head having interior doweling body thread and an exterior size larger than the doweling body cylinder and the central housing bore is a polygon bore functioning as the second part of the two part anti-rotation component. In many embodiments, the central housing bore 113 at the proximal end of the housing meets an enlarged recess 115 (also shown in FIG. 40) having a diameter substantially greater than the bore diameter. This recess accepts a biasing member, which is often a spring, and part of a drive element.

Figure 17:
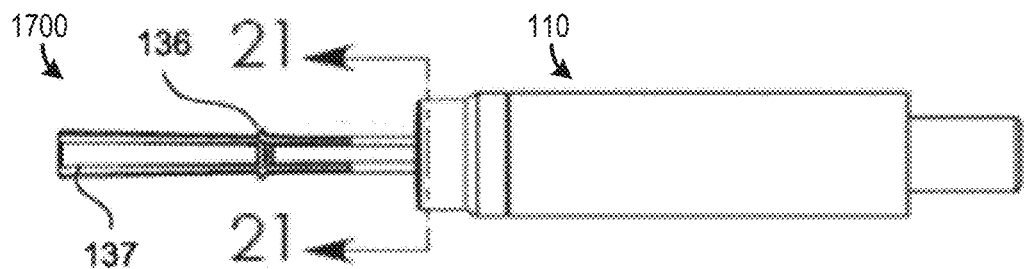
FIG. 17 is a side elevation view of a second alignment tool according to the present disclosure wherein the tool is shown in an insertion state, i.e., a nominal state.
Figure 18:
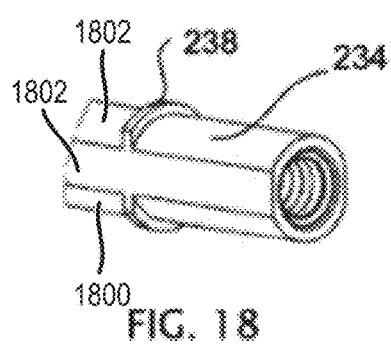
FIG. 18 is a perspective view of the proximal end of the second embodiment of a doweling body, particularly showing a second form of the first part of the two part anti-rotation component as well as the first part of a two part translation arresting means.
Figure 19:
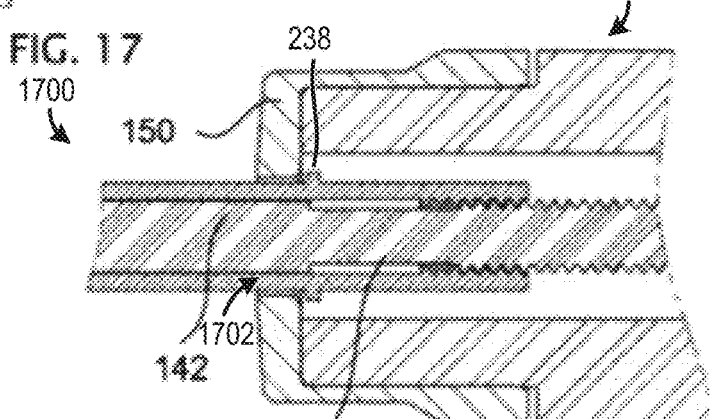
FIG. 19 is a detailed view of the initial threaded engagement and relative positions between the doweling body and the spreader element, as shown in FIG. 17.
Figure 20:
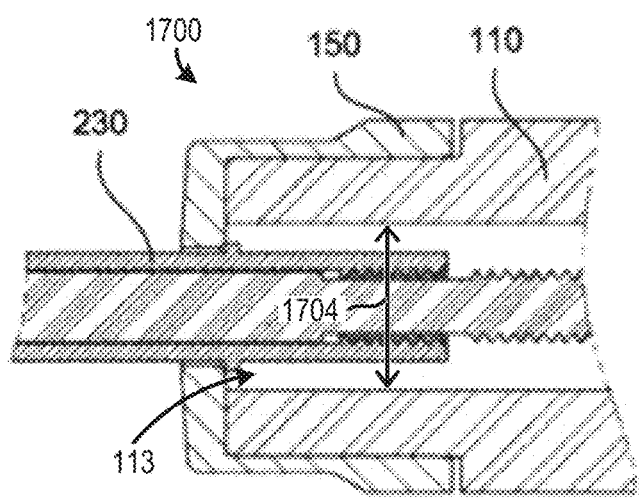
FIG. 20 is a detailed view of the threaded disengagement and relative positions between the doweling body and the spreader element when the tool is in a retraction state, i.e., doweling body threads are decoupled from spreader element threads.
Figure 21:
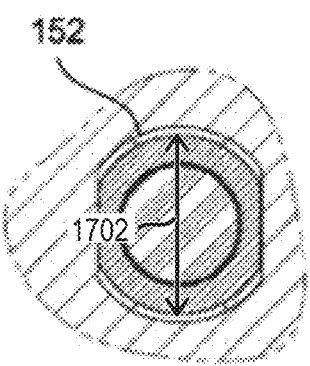
Figure 22:
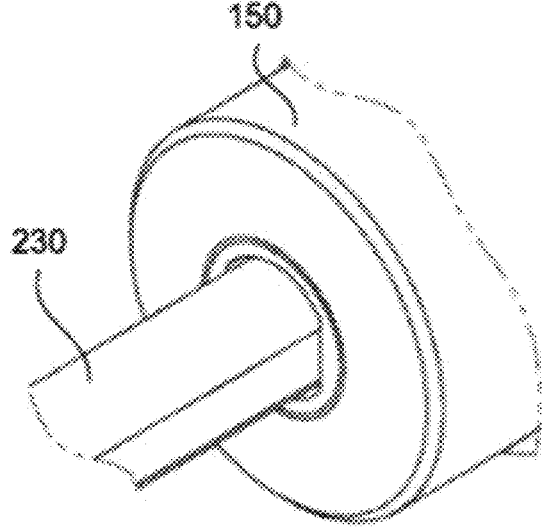
FIG. 22 is a partial perspective view of the housing distal end illustrating the size relationship between the external diameter and first part of the two part anti-rotation component of the doweling body and the orifice of the housing cap including the second part of the two part anti-rotation component, wherein the cap also prevents unintended hyper translation of the doweling body.

In another embodiment, shown in FIG. 17, the first part of the two part anti-rotation component may match (e.g., mates with) a central opening 1702 of a sleeve 150 in the housing 110. The central opening 1702 functions as a second part of the two part anti-rotation component.

Returning to FIGS. 1-4, the doweling body 130 also includes an interior threaded section 204 designed to engage with a threaded portion 144 of the spreader element 140. Therefore, it will be appreciated that rotation of the spreader element 140 will induce axial movement of the spreader element 140 with regard to the doweling body 130.

To facilitate re-engagement between the spreader element 140 and the doweling body 130, a bias element, such as spring 160, may be used to urge the spreader element distally (i.e., axially downward). In some embodiments, the alignment tool 100 further includes a drive sleeve 120 with a distal end 124 fixedly attached to the spreader element 140. The drive sleeve has a lip 122 residing in an enlarged recess 115 of the housing 110. The compression spring 160, or other suitable biasing member, is disposed between the lip 122 and a lid 170 disposed at the proximal end 114 of the housing 110 to urge the spreader element distally. However, in other examples, the alignment tool 100 may not include the spring 160 or the spring may be positioned in other suitable locations, as previously mentioned.

FIG. 1 also shows a tooling apparatus 190 (e.g., automated tooling apparatus) that may be used to manipulate the alignment tool 100 and carry out the methods described herein. The tooling apparatus 190 may include a processor 192 and memory 194 (i.e., non-transitory memory) storing instructions executable by the processor. It will be appreciated that the automated tooling apparatus 190 may further include tooling attachments, arms, carriages, etc., for manipulating the alignment tool 100.

Additionally, FIG. 4 shows an extrusion 136, doweling body cylinder 131, and tapered portion 137 of the doweling body 130 discussed in greater detail herein.

Figure 27:
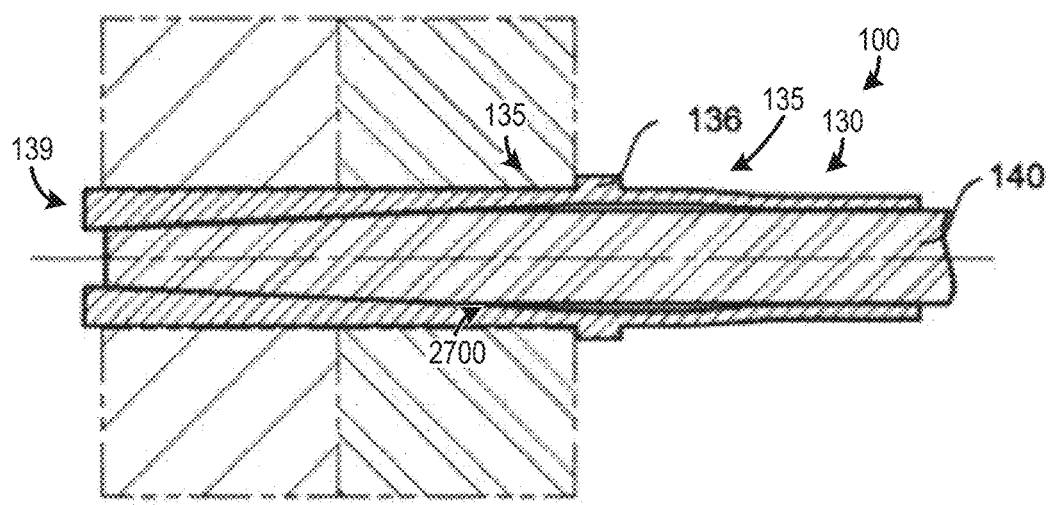
FIG. 27 is a detailed cross section view of the doweling body legs and spreader element of a tool according to the present disclosure, particularly illustrating the flexion of the proximal portions of the legs in the compliance zone when the spreader element is fully engaged with the doweling body.
Figure 28:
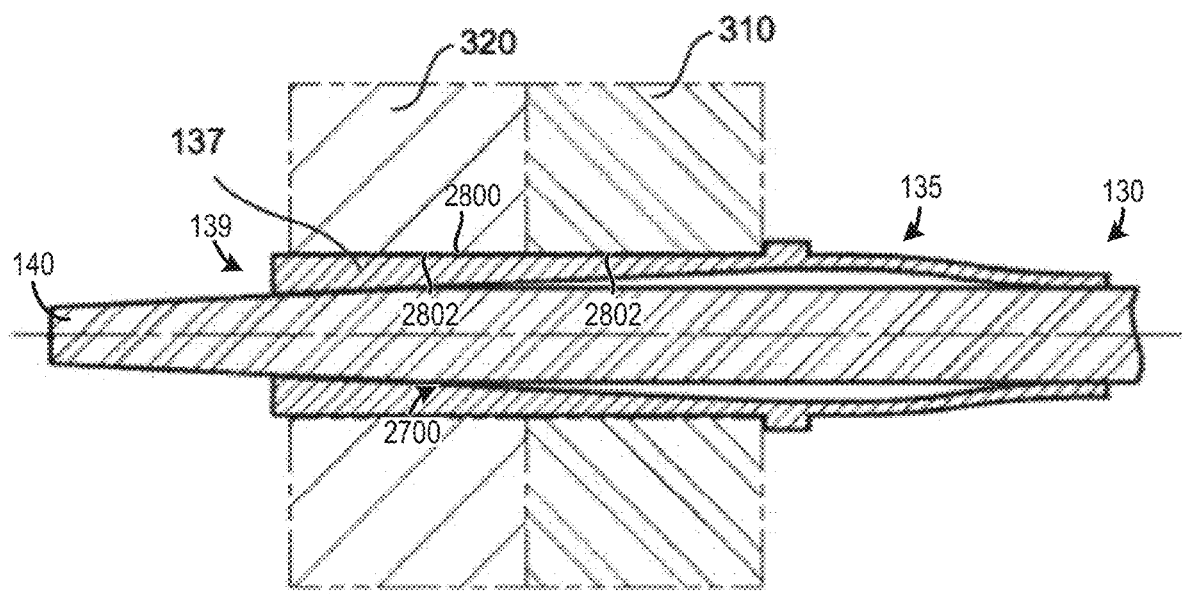
FIG. 28 is an illustrative version of FIG. 27 wherein the doweling body leg compliance is significantly emphasized in a stack of work piece holes with larger holes to show the conformance thereof with the proximal work piece hole through a cantilever or induced force effect (which thereby functions to position the work pieces in the stack).
Figure 36:
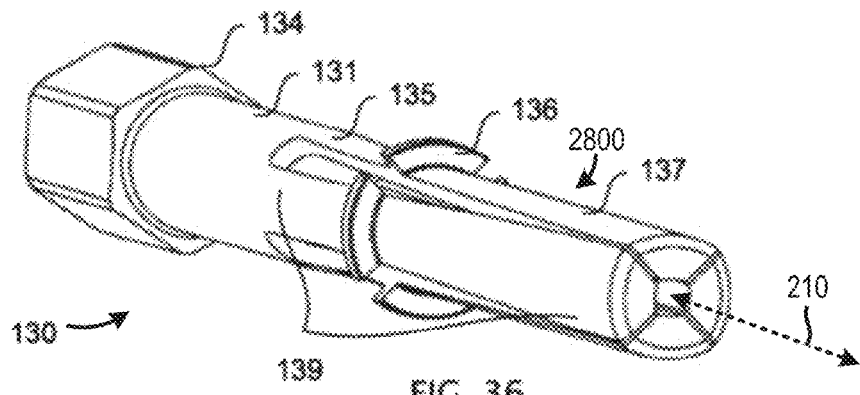
FIG. 36 is an end perspective view of a doweling body shown in an insertion state.
Figure 37:
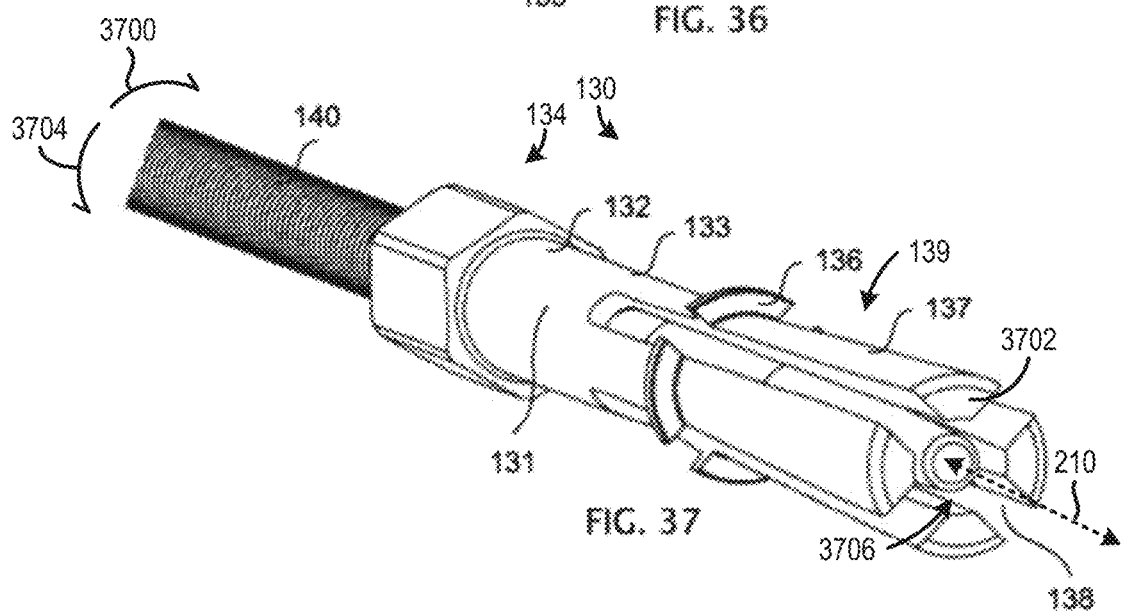
FIG. 37 shows the doweling body of FIG. 36 after relative insertion of a spreader element and radial displacement of the doweling body legs.

Referring to FIGS. 29-37, the plurality of doweling body legs 139 extend longitudinally from the distal end 132 of the doweling body cylinder 131 and defining a plurality of longitudinal slots 138, shown specifically in FIG. 37, between the doweling body legs, each doweling body leg having a transition (or tapered) portion 137 and a compliance zone 135 capable of temporary distortion to allow the doweling body legs to have a converging, diverging, or parallel radial profile. Thus, the compliance zone 135 enables the doweling body legs 139 to shift inwardly toward and outwardly away from the axis 210 (e.g., central axis). In some embodiments, the transition (or tapered) portion 137 and the doweling body cylinder 131 are stiff and strong thus inhibiting bending or other distortion to the material. On the other hand, the compliance zone 135 is flexible and may conform to different shapes necessary to bridge the differences in the resultant physical shape of the two stiff sections. Yet, it also retains its original memory and will return to its original shape and in doing so, return the relative physical position of the transition (or tapered) portion 137 to that of the doweling body cylinder 131. In some embodiments, each doweling body leg has an extrusion 136 expanding radially outward where the transition portion joins the compliance zone. The extrusion 136 may function as a base position upon which the work pieces are stacked, as also illustrated in FIGS. 27-28. Thus, the extrusion 136 may axially delimit the degree to which the doweling body 130 can be inserted into holes in work pieces. Consequently, the stiff section of the alignment tool may remain in a work piece hole to facilitate alignment while at the same time keeping the compliance zone out of the hole so the compliance zone can freely move.

In some embodiments, the transition (or tapered) portion 137 is characterized as an area of non-uniform radial sectional or wall thickness (also referred to as a flare), and/or non-uniform arc length. As illustrated in FIGS. 29-35, a change in radial sectional thickness and/or arc length of a leg portion intentionally affects flexion characteristics of the legs in very specific and intentional ways. For example, the transition (or tapered) portion 137 has a decreasing sectional thickness extending from the distal ends thereof towards the proximal end of the doweling body. Specifically, the transition portion 137 may have a negative taper angle, in one example. The term "taper" means a progressively changing material thickness in the radial direction (sectional thickness). In addition to the modifying leg taper in the doweling bodies of the present disclosure to affect flexural characteristics of the sectional thickness, such characteristics can also be modified by varying the arc length of the transition (or tapered) portion 137, e.g., by modifying the slot width. Thus, a leg section wherein increased flexion is desired can have both reduced sectional thickness as well as reduced arc length, compared to adjacent leg sections. In one example, the tapered profile of the legs and the doweling body may create a contact geometry that facilitates parallel expansion of the legs when in contact of holes of varying diameters.

Figure 38:
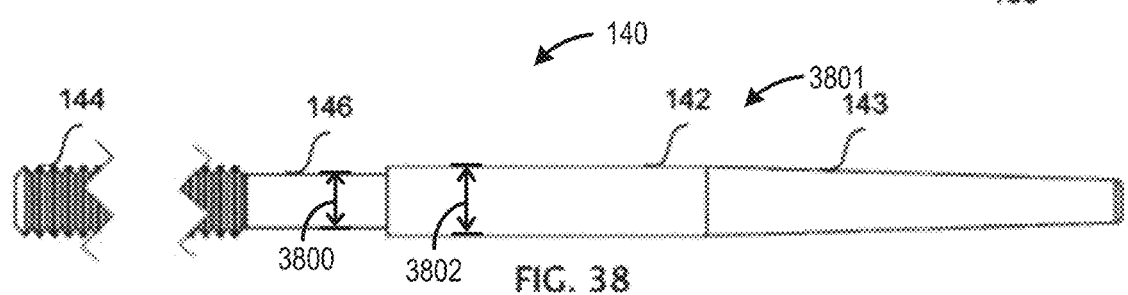
FIG. 38 is an elevation view of one spreader element embodiment wherein the doweling body contacting surface is smooth.
Figure 39:
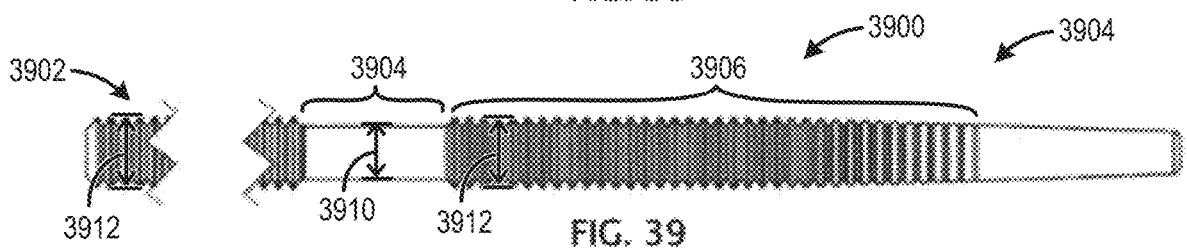
FIG. 39 is an elevation view of another spreader element embodiment wherein the doweling body contacting surface is formed by reducing the diameter of the element at its distal end.

The spreader element 140, shown in FIG. 38, may at least partially reside within the central doweling body bore 2900 of the doweling body 130, shown in FIG. 29. The spreader element 140 is at least partially threaded for threaded engagement to the doweling body 130 which allows the doweling body legs to have a converging, diverging, or parallel radial profiles. In the embodiment shown in FIG. 38, the spreader element 140 may include a spreader body 142, a tapered portion 143, and a threaded portion 144. However in other examples, the spreader element 140 may include additional or alternative suitable sections such as inwardly curved portions, outwardly curved portions, etc. Additionally, the tapered portion 143 may not be threaded, as shown in FIG. 38. However in other examples, the tapered portion may be threaded. Further, in other examples, a section of the tapered portion may be threaded, as shown in FIG. 39. Providing a section of the tapered portion with threads increases the adaptability of the manufacturing process.

Referring again to FIG. 38, the tapered portion 143 has a non-uniform cross-section with a decreasing diameter extending away from the spreader body. The tapered portion 143 may have compressive engagement with the plurality of doweling body legs when assembled in the alignment tool. As the tapered portion 143 moves longitudinal from the distal end 132 of the doweling body cylinder toward the doweling body legs 139, shown in FIG. 29, the compressive engagement induces displacement to diverge the doweling body legs against work piece surfaces that define the holes for alignment.

Referring to FIGS. 27-28, when the doweling body legs 139 are inserted into a plurality of holes defined by a work piece stack including at least work piece 310 and work piece 320, the transition (or tapered) portion 137 of the legs are urged radially outwardly, such as by the relative introduction of a spreader element there at (relative introduction is independent of whether the spreader element moves towards the distal end of the doweling body or the doweling body moves towards the proximal end of the spreader element), the distal outer surfaces of the legs first meet resistance due to the negative taper present in the legs. As the spreader element 140 extends further through the doweling body legs 143, a greater "induced" radially outward displacement is created proximally from the point 2700 of the spreader element in contact with each leg inner surface. This induced displacement mimics the compliance created by a cantilever if the legs were unconstrained by the doweling body at their roots.

In some embodiments, the spreader element 140 includes a reduced diameter portion 146, shown in FIGS. 3 and 38, that threadably decouples the doweling body from the spreader element. This portion, which is preferably also unthreaded, provides an alternative means for arresting over rotation of the spreader element that might otherwise cause thread binding and tool breakage if a hard stop feature were used. To facilitate reengagement between the spreader element and the doweling body, a bias element is used to urge the spreader element distally. In some embodiments, such as the embodiment shown in FIG. 3, a compression spring 160 or other biasing elements is disposed between a lid 170 disposed at the proximal end 114 of the housing and a drive sleeve 120 having a lip 122 for receiving one end of the compression spring where the drive sleeve is fixedly attached to the spreader element (the other end of the bias element being received by a portion of the housing). The lip 122 radially extends outward from the axis 210 to retain the drive sleeve 120 and the compression spring 160 within the alignment tool 100.

FIGS. 5-8 illustrate various views of the hole alignment tool 100 in an initial dowelling state according to the present disclosure. In the initial dowelling state, the spreader element 140 has threaded engagement with the doweling body 130 and may be rotated to start inducing a radially outward force to the doweling body legs 139 for a diverging radial profile. The radial outward force may be used to retain the hole alignment tool 100 in holes in a work piece.

FIG. 5 also depicts the extrusion 136 in the doweling body 130, the sleeve 150 in the housing 110, a proximal end 114 of the housing, and a drive sleeve 120. In FIG. 5 the doweling body legs 139 are opened in an outward tapered shape in an initial dowelling state.

FIG. 6B also shows the reduced diameter portion 146 of the spreader element 140. As shown, the reduced diameter portion 146 is not axially aligned with the interior threaded section 204 of the doweling body 130. Additionally, FIG. 6B shows a section 600 of the sleeve 150 extending inwardly toward axis 210. The section 600 of the sleeve 150 prevents the doweling body 130 and the spreader element 140 from separating from the housing. As such, components of the alignment tool may remain together as a single unit, especially during insertion and removal of the tool. FIG. 6B also shows a bias component 602 (e.g., a spring) located between the proximal end of the doweling body 130 and the sleeve 150. However in other examples, the bias component 602 may be omitted from the alignment tool.

FIG. 7 shows the drive sleeve 120 with the spreader element 140 extending therethrough. The threaded portion 144 of the spreader element 140 is shown threaded with the threaded section 204 of the doweling body 130.

FIG. 8 shows the spreader body 142 of the spreader element 140 spreading the doweling body legs 139 of the doweling body 130. The tapered portion 143 of the spreader element 140 is also shown in FIG. 8 along with the compliance zone 135, extrusion 136, and tapered portion of the doweling body 130.

FIGS. 5-8 show the sleeve 150 that is coupled to the housing 110. Additionally, the drive sleeve 120 is coupled to the spreader element 140. Specifically, the drive sleeve is coupled to a threaded end of the spreader element. Exemplary coupling techniques between the sleeve 150 and the housing 110 and/or the drive sleeve 120 and the spreader element 140 include press fitting, brazing, bonding, pinning, stacking, etc.

Figure 11:
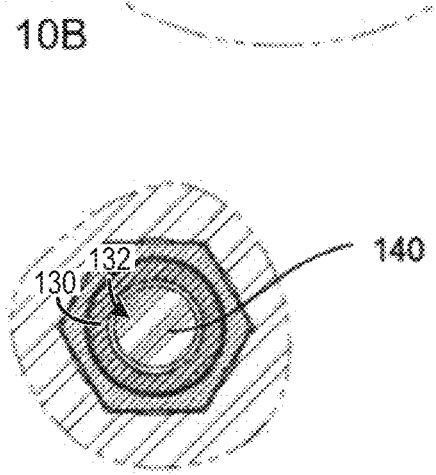
FIG. 11 is a cross section elevation view taken substantially along the line 11-11 in FIGS. 9 and 10, particularly showing the concentric relationships between the spreader element, the doweling body, a threaded bushing inserted there between, and the housing bore, as well as the interactions between the first and second parts of the anti-rotation component.
Figure 12:
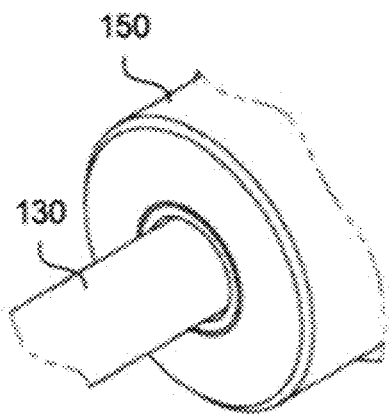
FIG. 12 is a partial perspective view of the housing distal end illustrating the size relationship between the external diameter of the doweling body and the orifice of a cap, which prevents unintended hyper translation of the doweling body.

FIGS. 9-12 illustrate various views of the hole alignment tool 100 in a final dowelling state according to the present disclosure. In the final dowelling state, the spreader element 140 has threaded engagement with the doweling body 130 to the maximum degree (defined by the maximal allowable retraction of the doweling body into the housing). The doweling body legs 139 are shown diverging to a maximum degree for aligning large holes (as shown in FIG. 28 also). Specifically, FIG. 10B shows an enlarged view of a cross-section of the alignment tool 100, shown in FIG. 10A. As depicted, the threaded portion 144 of the spreader element 140 is further threaded into the threaded section 204 of the doweling body 130. FIG. 11 shows the distal end 132 of the doweling body 130 and the spreader element 140 positioned within the doweling body 130.

FIGS. 13-16 illustrate various views of the alignment tool 100 of FIG. 1 with doweling body threads decoupled from spreader element threads. Specifically, the threaded section 204 of the doweling body 130 is not threaded with the threaded portion 144 of the spreader element 140. The reduced diameter portion 146 threadably decouples the doweling body 130 from the spreader element 140. The decoupling between the spreader element 140 and the doweling body threads provides an alternative means for arresting over-rotation of the spreader element that might otherwise cause thread binding and tool breakage if a hard stop feature were used. In other words, the spreader element 140 may be allowed to freely spin with regard to the doweling body 130 when the reduced diameter portion 146 is axially aligned with the threaded section 204 of the doweling body 130. Consequently, damage to the alignment tool caused by over-rotation can be avoided, if desired. FIG. 15 also shows the drive sleeve 120, the housing 110, and the sleeve 150 at the distal end 112 of the housing. FIG. 16 additional depicts the extrusions 136 of the doweling body legs 139 in the doweling body 130.

FIGS. 17-22 illustrate various views of an alignment tool 1700 with a second embodiment of a doweling body 230 according to the present disclosure wherein the tool is shown in an insertion state. The doweling body 230 is mostly similar to the doweling body 130. However, the doweling body 230 includes a different first part of the two part anti-rotation component. Instead of utilizing a polygon head as part of anti-rotation component, the doweling body 230 includes a non-circular extrusion 238 expanding radially outward and disposed near the proximal end 234 of the doweling body cylinder. The non-circular extrusion 238 includes a planar section 1800 and two curved sections 1802. The housing 110 is shown including the sleeve 150 at the distal end of the housing, the sleeve having a central opening 152 smaller than the central housing bore to hold the doweling body in position. Specifically, the diameter 1704 of the central opening 152 is less than the diameter 1704 of the central housing bore 113. Furthermore, the central opening 152 of the sleeve 150 matches (e.g., mates with) the non-circular extrusion to function as the second part of the two part anti-rotation component.

Figure 23:
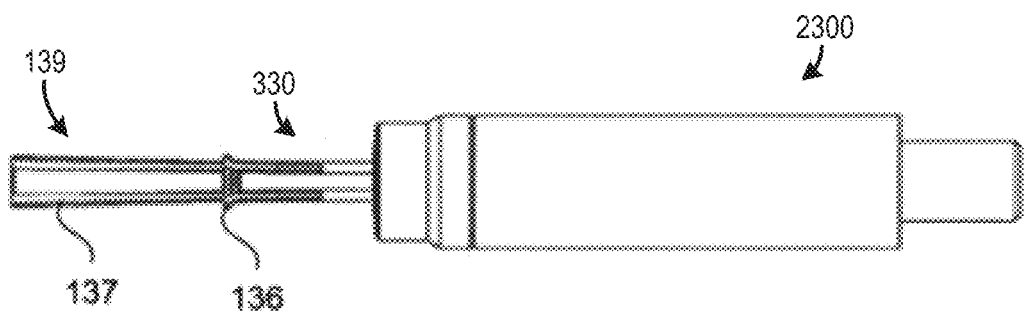
FIG. 23 is a side elevation view of a third alignment tool according to the present disclosure wherein the tool is shown in an insertion state, i.e., a nominal state.
Figure 24:
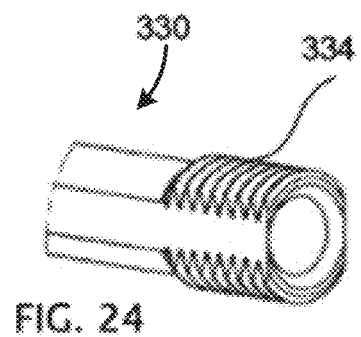
FIG. 24 is a perspective view of the proximal end of the third embodiment doweling body, particularly showing the second form of the first part of the two part anti-rotation component as well as another form of the first part of the two part translation arresting means, and an externally threaded arrangement.
Figure 25:
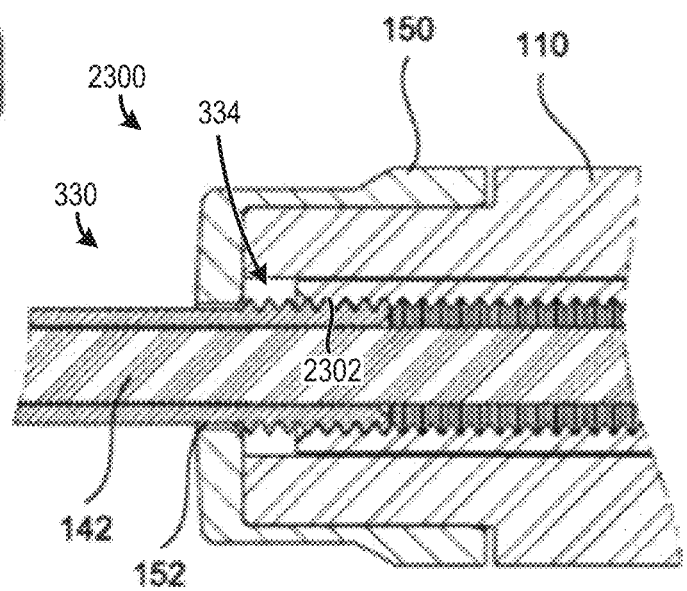
FIG. 25 is a detailed view of the threaded engagement and relative positions between the doweling body and drive sleeve (as opposed to using a threaded spreader element), as shown in FIG. 23.
Figure 26:
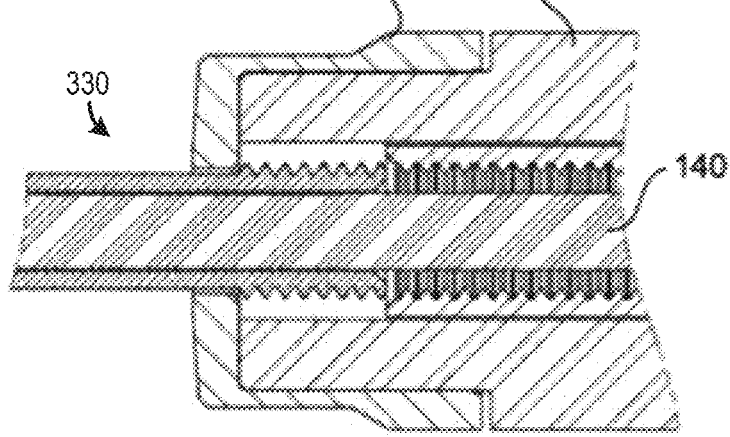
FIG. 26 is a detailed view of the threaded disengagement and relative positions between the doweling body and the drive sleeve when the tool of FIG. 23 is in a retraction state, i.e., doweling body threads are decoupled from drive sleeve threads.

FIGS. 23-26 illustrate various views of an alignment tool 2300 with a third embodiment of a doweling body 330. FIGS. 23-26 show the alignment tool 2300 in an insertion state. The doweling body 330 is mostly similar to the doweling body 130, described above, except the doweling body 330 has a different first part of the two part anti-rotation component. Instead of utilizing a polygon head as part of anti-rotation component, the doweling body 330 includes a non-circular proximal end 334 threaded outward, which has an exterior size larger than the doweling body cylinder. The non-circular proximal end 334 may be threadingly engaged with a threaded section 2302 of the housing 110, in the illustrated example. The sleeve 150 is designed to embrace the distal end 112 of the housing, the sleeve having a central opening 152 smaller than the central bore of the housing to hold the doweling body in position. Furthermore, the central opening 152 of the sleeve matches (e.g., mates with) the non-circular proximal end 334 to function as the second part of the two part anti-rotation component. FIG. 23 also shows the doweling body legs 139 in the doweling body 330 and extrusions 136 in the doweling body legs.

FIG. 27 is a detailed cross section view of the doweling body legs 139 and spreader element 140 in the alignment tool 100, according to the present disclosure, particularly illustrating the flexion of the proximal portions of the legs in the compliance zone 135 when the spreader element 140 is fully engaged with the doweling body 130.

FIG. 28 is an illustrative version of FIG. 27 wherein the doweling body leg compliance is significantly emphasized in a larger stack of work piece holes to show the conformance thereof with the proximal work piece hole through a cantilever or induced force effect (which thereby functions to position the work pieces in the stack). As shown in FIG. 28 the compliance zones 135 of the doweling body 130 is design to deform to allow outer surfaces 2800 of the doweling body legs 139 to exert substantially uniform radial forces against surfaces 2802 in holes of the work pieces 310 and 320.

FIG. 29 is a perspective view of the doweling body 130 having only a single leg for simplicity of illustrating the stiffness characteristics of the leg, as previously discussed.

Figure 30:
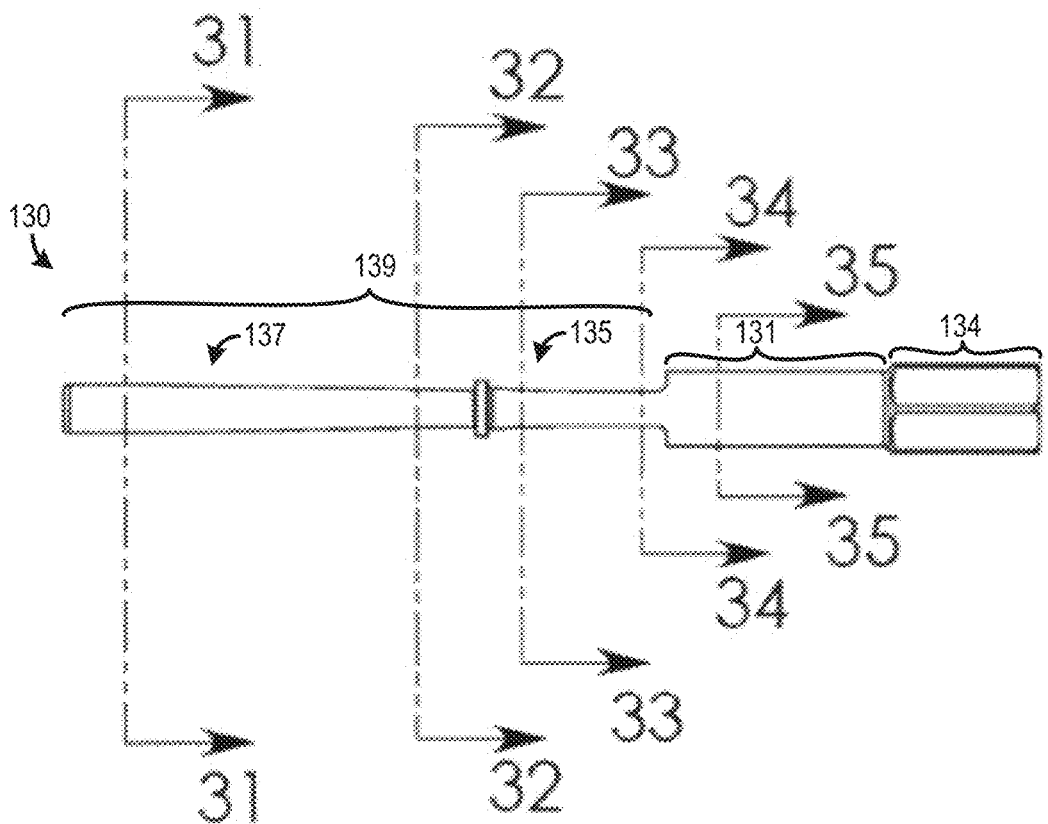
FIG. 30 is a plan view of the doweling body of FIG. 29.
Figure 31:
FIGS. 31-35 are a series of sectional views from FIG. 29 illustrating the varying sectional thickness and arc lengths of the described leg taken along their respective cutting planes, which are used to modify the mechanical characteristics thereof.
Figure 32:
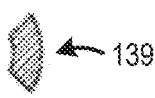
Figure 33:
Figure 34:
Figure 35:
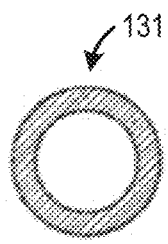

FIG. 30 is a plan view of the doweling body 130 of FIG. 29. In particular, the doweling body legs 139, tapered portion 137, compliance zone 135, doweling body cylinder 131, and first part 134 of the two part anti-rotation component of the doweling body 130, are shown in FIG. 30.

FIGS. 31-35 are a series of sectional views from FIG. 29 illustrating the varying sectional thickness and arc lengths of the described leg taken along their respective cutting planes, which are used to modify the mechanical characteristics thereof. FIGS. 31-34 specifically, show cross-sections of the doweling body legs 139 and FIG. 35 specifically shows a cross-section of the doweling body cylinder 131.

FIG. 36 is an end perspective view of the doweling body 130 shown in an insertion state. In the insertion state the doweling body legs 139 may be in a neutral position or a slightly flexed position where outer surfaces 2800 of the doweling body legs 139. In the neutral position outer surfaces 2800 of the doweling body legs 139 may extend inwards toward the axis 210 along their lengths, as is shown in FIG. 36. However, in other examples, in the neutral position the outer surfaces 2800 of the doweling body legs 139 may be parallel to the axis 210. Thus, in the neutral position the doweling body 130 may be smoothly inserted into cylindrical holes in work pieces. Furthermore, as previously discussed, the extrusion 136 in the doweling body 130 may axially delimit the degree to which the doweling body can be inserted into holes of work pieces.

FIG. 37 shows the doweling body of FIG. 36 after relative insertion of the spreader element 140 and radial displacement of the doweling body legs 139. Thus, the spreader element 140 is further threaded into the doweling body 130 to axially advance the spreader element with regard to the doweling body. Axially advancing the spreader element 140 into the doweling body 130 causes the spreader body 142 to urge the doweling body legs 139 in an outward radial direction away from the axis 210 (e.g., central axis) to place the legs in a doweling state (e.g., engagement state). Furthermore, it will be appreciated that rotation of the spreader element 140 in a first direction 3700 generates axial translation of the spreader element 140 towards ends 3702 of the doweling body legs 139. In this way, the spreader element 140 may be extended to induce flexion of the doweling body legs 139 away from the central axis 210. On the other hand, rotation of the spreader element in a second direction 3704, opposite the first direction 3700, generates axial translation of the spreader element 140 away from the ends 3702 of the doweling body legs 139. Thus, the spreader element 140 may be retracted to induce movement of the doweling body legs 139 towards the central axis 210. A gap 3706 between the spreader element 140 and the doweling body legs 139 is also shown in FIG. 37. It will be appreciated that when the alignment tool is positioned in a work piece hole, the hole pushes on the outside of the distal end of the doweling body legs 139 until the gap 3706 is closed. Closing the gap 3706 in this manner forces the proximal end of the legs to rise up. The movement of the legs in this manner is enabled by the compliant sections of the legs.

FIG. 38 is an elevation view of the spreader element 140 wherein the doweling body contacting surface 3801 is smooth. Specifically, FIG. 38 shows the threaded portion 144, the reduced diameter portion 146, the spreader body 142, and the tapered portion 143. The reduced diameter portion 146 is unthreaded in the illustrated example and has a smaller diameter 3800 than the diameter 3802 of the spreader body 142. The reduced diameter portion 146 enables the spreader element 140 to freely rotate when the threaded portion 144 of the spreader element 140 is unthreaded from the threaded section 204 of the doweling body 130, shown in FIG. 2B. However, it will be appreciated that in other examples, the reduced diameter portion may be omitted from the spreader element.

FIG. 39 is an elevation view of another embodiment of a spreader element 3900 wherein the doweling body contacting surface is formed by reducing the diameter of the element at its distal end. Specifically, FIG. 39 shows the spreader element 3900 including an upper threaded section 3902, an unthreaded section 3904, a lower threaded section 3906, and a tapered portion 3908. The unthreaded section 3904 is positioned axially between the upper threaded section 3902 and the lower threaded section 3906 and has a diameter 3910 that is less than the diameters 3912 of upper and lower threaded sections, 3902 and 3906, respectively. It will be appreciated that the spreader element 3900 may be included in any of the embodiments or combinations of the embodiments of the alignment tool, described herein.

FIG. 40 is a perspective view of the proximal end 114 of the housing 110 according to the first embodiment of the present disclosure. Viewing plane 4000 defining the cross-sectional view shown in FIG. 41 is also depicted in FIG. 40, for reference.

FIG. 41 is a cross section of the housing 110 of FIG. 40, particularly showing the geometry of the first form of the second part of the two part anti-rotation component. As previously discussed, the second part of the two part anti-rotation component, in this example, is the central housing bore 113. In the illustrated example, the central housing bore 113 has a hexagonal shape with sides 4100 (e.g., planar faces). However, other geometries have been contemplated, such as an octagonal bore, a square bore, a bore with one or more lobes, etc.

FIG. 42 is a perspective view of the distal end 112 of the housing 110 of FIG. 40.

FIGS. 1-42 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 43 shows a method 4300 for aligning holes in a plurality of work pieces. Method 4300 may be implemented by any of the alignment tools and/or tooling apparatus, described above with regard to FIGS. 1-42. However in other examples, the method 4300 may be implemented by other suitable alignment tools and/or tooling apparatuses, in other examples.

At 4302 the method includes inserting a plurality of doweling body legs through the holes in the plurality of work pieces, the doweling body legs extending longitudinally from a doweling body cylinder and defining a plurality of longitudinal slots between the doweling body legs, each doweling body leg having a stiff tapered portion and a compliance zone capable of temporary distortion, the doweling body cylinder having a central bore at least partially threaded.

Next at 4304 the method includes rotating a spreader element at least partially residing within the central bore of the doweling body, the spreader element having a tapered portion for compressive engagement with the plurality of doweling body legs, the compressive engagement inducing a uniform force to diverge the doweling body legs against work piece surfaces that define the holes for alignment. It will be appreciated that rotation of the spreader element causes axial translation of the spreader element with respect to the doweling body legs. In one example, the tapered portion is an area having a decreasing sectional thickness and decreasing arc length extending towards the doweling body. Method 4300 enables the alignment tool to be efficiently inserted into work pieces and then to uniformly radially engage the work pieces to reduce the likelihood of work piece deformation.

Those skilled in the art will realize that the alignment tool can be constructed with various configurations. For example an alignment tool may include different combination of components other than disclosed in the aforementioned embodiments. Those skilled in the art will also realize that an alignment tool may further incorporate different components. The foregoing description of the present disclosure has been described for purposes of clarity and understanding. Various modifications may be implemented within the scope and equivalence of the appended claims.

Note that the example control and estimation routines included herein can be used with various alignment tool configurations. The control methods and routines disclosed herein may be stored as executable instructions in non-transitory memory and may be carried out by an alignment tool.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the alignment tool and/or tooling apparatus, where the described actions are carried out by executing the instructions in a tooling apparatus and alignment tool including the various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A doweling body for use in an alignment tool, comprising:
    a doweling body cylinder defining a doweling body central bore with a longitudinal axis, and including a proximal end, a distal end, and a body portion positioned axially between the proximal end and the distal end;
    a first part of a two-part anti-rotation component disposed at the proximal end, the first part of the two-part anti-rotation component mating with a second part of the two-part anti-rotation component included in a housing to inhibit rotation of the doweling body and the housing and allow axial translation of the doweling body with regard to the housing;
    a plurality of doweling body legs extending longitudinally from the distal end of the doweling body cylinder and defining a plurality of longitudinal slots between the plurality doweling body legs, each doweling body leg having a transition portion and a compliance zone capable of temporary distortion to allow the plurality of doweling body legs to shift outwardly away from a central axis in an engagement state; and
    a spreader element engaged by the doweling body;
    wherein the compliance zones temporarily distort during the engagement state;
    wherein in the engagement state the plurality of doweling body legs have a diverging radial profile;
    wherein the engagement between the doweling body and the spreader element moves the plurality of doweling body legs outward to exert radial forces against surfaces of holes in a plurality of work pieces in the engagement state;
    wherein the doweling body has an extrusion that extends radially outward from an outer surface and axially delimits alignment tool insertion into the plurality of work pieces;
    wherein an axial position of the doweling body in relation to the plurality of work pieces remains unchanged during the engagement state;
    wherein the transition portion is an area of non-uniform wall thickness; and
    wherein the transition portion has a decreasing sectional thickness in a direction extending towards the distal end of the doweling body cylinder.

2. The doweling body of claim 1, wherein the transition portion is an area of non-uniform arc length.

3. The doweling body of claim 2, wherein the transition portion has a decreasing arc length extending towards the distal end of the doweling body cylinder.

4. The doweling body of claim 1, wherein each of the plurality of doweling body legs has an extrusion expanding radially outward where the transition portion joins the compliance zone.

5. The doweling body of claim 1, wherein the first part of the two-part anti-rotation component is a polygon head having an exterior size larger than the doweling body cylinder.

6. The doweling body of claim 1, wherein the first part of the two-part anti-rotation component is a non-circular extrusion expanding radially outward and disposed near the proximal end of the doweling body cylinder.

7. The doweling body of claim 1, wherein the first part of the two-part anti-rotation component is a head threaded outward with an exterior size larger than the doweling body cylinder, the threaded head having a non-circular cross-section for anti-rotation engagement.

8. An alignment tool for aligning holes in a plurality of work pieces, the alignment tool comprising:
   a doweling body comprising:
      a doweling body cylinder with a proximal end, a distal end, and a central doweling body bore at least partially threaded; and
      a plurality of doweling body legs extending longitudinally from the distal end of the doweling body cylinder and defining a plurality of longitudinal slots between the plurality of doweling body legs, wherein each doweling body leg has a stiff tapered portion and a compliance zone that temporarily distorts during an engagement state, wherein in the engagement state the plurality of doweling body legs have a diverging radial profile; and
   a spreader element engaged by the doweling body;
   wherein the engagement between the doweling body and the spreader element moves the plurality of doweling body legs outward to exert radial forces against surfaces of the holes in the plurality of work pieces in the engagement state;
   wherein the doweling body has an extrusion that extends radially outward from an outer surface and axially delimits alignment tool insertion into the plurality of work pieces;
   wherein an axial position of the doweling body in relation to the plurality of work pieces remains unchanged during the engagement state; and
   wherein the stiff tapered portion is an area having a decreasing sectional thickness extending towards the distal end of the doweling body cylinder.

9. The alignment tool of claim 8, wherein the stiff tapered portion is an area adjacent to a varying slot width area.

10. The alignment tool of claim 8, wherein, in an insertion state the plurality of doweling body legs have a converging radial profile or a parallel radial profile.

11. The alignment tool of claim 8, further comprising a housing including a sleeve embracing a distal end of the housing, wherein the sleeve has a central opening smaller than a central housing bore to hold the doweling body in position.

12. The alignment tool of claim 11, wherein the spreader element radially tapers along a central axis of the spreader element toward a distal end of the spreader element.

13. The alignment tool of claim 11, further comprising a first part of the two-part anti-rotation component that includes a non-circular extrusion expanding radially outward and is disposed near the proximal end of the doweling body cylinder, wherein the central opening of the sleeve mates with the non-circular extrusion to function as a second part of the two-part anti-rotation component.

14. The alignment tool of claim 11, further comprising a first part of the two-part anti-rotation component that includes a non-circular proximal end threaded outward, the non-circular proximal end having an exterior size larger than the doweling body cylinder, wherein the central opening of the sleeve mates with the non-circular extrusion to function as a second part of the two-part anti-rotation component.

15. The alignment tool of claim 8, further comprising a drive sleeve fixedly attached to the spreader element, wherein the drive sleeve has a lip residing in an enlarged recess of a housing, the enlarged recess disposed in the central doweling body bore at the proximal end of the housing having a diameter greater than a bore diameter, a compression spring disposed between the lip and a lid disposed at the proximal end of the housing to urge the spreader element distally.

16. The alignment tool of claim 8, wherein the extrusion expands radially outward where the stiff tapered portion joins the compliance zone.

17. A method for aligning holes in a plurality of work pieces, the method comprising:
   inserting a plurality of doweling body legs through the holes in the plurality of work pieces, the plurality of doweling body legs extending longitudinally from a doweling body cylinder and defining a plurality of longitudinal slots between the plurality of doweling body legs, each doweling body leg having a stiff tapered portion and a compliance zone capable of temporary distortion, the doweling body cylinder having a central bore at least partially threaded, wherein the plurality of doweling body legs are included in a doweling body; and
   rotating a spreader element at least partially residing within the central bore of the doweling body to place the doweling body in an engagement state, the spreader element having a tapered portion for compressive engagement with the plurality of doweling body legs, the compressive engagement inducing a uniform force to diverge the plurality of doweling body legs against work piece surfaces that define the holes for alignment;
   wherein the compliance zones temporarily distort in the engagement state;
   wherein the doweling body has an extrusion that extends radially outward from an outer surface and axially delimits alignment tool insertion into the plurality of work pieces;
   wherein an axial position of the doweling body in relation to the plurality of work pieces remains unchanged during the engagement state; and
   wherein the tapered portion is an area having a decreasing sectional thickness and a decreasing arc length extending towards the doweling body.

* * * * *